(12) United States Patent
Shultz (10) Patent No.: US 9,984,587 B2
(45) Date of Patent: May 29, 2018

(54) VIRTUAL AND LIVE PLAY HYBRID GOLF ATTRACTION

(71) Applicant: David Shultz, Anaheim, CA (US)

(72) Inventor: David Shultz, Anaheim, CA (US)

( * ) Notice: Subject to any disclaimer, the term of this patent is extended or adjusted under 35 U.S.C. 154(b) by 30 days.

(21) Appl. No.: 15/228,803

(22) Filed: Aug. 4, 2016

(65) Prior Publication Data

US 2017/0036095 A1    Feb. 9, 2017

Related U.S. Application Data

(60) Provisional application No. 62/201,178, filed on Aug. 5, 2015.

(51) Int. Cl.
*A63B 67/02* (2006.01)
*G09B 19/00* (2006.01)

(52) U.S. Cl.
CPC .................. *G09B 19/0038* (2013.01)

(58) Field of Classification Search
None
See application file for complete search history.

(56) References Cited

U.S. PATENT DOCUMENTS

| 3,501,152 | A | * | 3/1970 | Witucki | A63B 24/0021 473/152 |
| 4,437,672 | A | * | 3/1984 | Armantrout | A63B 24/0021 473/153 |
| 4,836,551 | A | * | 6/1989 | LaSalle | A63B 24/0021 473/152 |
| 5,226,660 | A | * | 7/1993 | Curchod | A63B 24/0021 473/155 |
| 5,390,927 | A | * | 2/1995 | Angelos | A63B 24/0021 434/252 |
| 9,314,683 | B2 | * | 4/2016 | Lee | A63B 69/3658 |
| 2013/0274025 | A1 | * | 10/2013 | Luciano, Jr. | A63B 69/3658 473/156 |

FOREIGN PATENT DOCUMENTS

| KR | 20020092266 A | * | 12/2002 | |
| KR | 20150053370 A | * | 5/2015 | |
| WO | WO 2012091514 A2 | * | 7/2012 | G09B 19/0038 |
| WO | WO 2013019078 A2 | * | 2/2013 | G09B 19/0038 |

* cited by examiner

*Primary Examiner* — Tramar Harper
(74) *Attorney, Agent, or Firm* — Clement Cheng (57) ABSTRACT

The golf course has a hybrid configuration with a virtual golf simulator tee off for the fairway which transitions to a live play environment once the user approaches the green. The virtual golf simulator can have a booth like configuration with a lounge behind the simulator. The user hits a ball in the simulator and the simulator senses the position and motion of the shot to calculate a starting location on the live play environment. The user then enters the live play environment and finishes the course in live play. A variety of different simulators can be used with the live play environment.

9 Claims, 5 Drawing Sheets

VIRTUAL AND LIVE PLAY HYBRID GOLF ATTRACTION

This application claims priority from and is a non-provisional of provisional application 62/201,178 entitled Transition Software For Hybrid Golf Course by inventor David Shultz filed Aug. 5, 2015, the disclosure of which is incorporated herein by reference.

FIELD OF THE INVENTION

The present invention is in the field of golf attractions.

DISCUSSION OF RELATED ART

Amusement parks and fun centers have a variety of different attractions, such as roller coasters, trampoline parks and theme park rides. Sometimes modified golf games such as videogame golf, and miniature golf can be added to amusement parks, but unfortunately these are not very realistic and have become passé over time. Therefore, theme parks are always looking for new and exciting attractions.

A wide variety of different golf simulation games can be played in a virtual environment. A variety of virtual golf simulators have been created for indoor golf. Although the patent literature is highly developed in the field of virtual golf simulators, not all of the systems have been highly accurate until recently. Many of the descriptions of the virtual golf simulators had high error until recently when laser infrared sensor arrays became more widely available on a commercial scale. Previously, laser infrared sensor arrays had only been used in the military for tracking a variety of different military targets. The patent literature is also very complete in discussing laser infrared sensor arrays and their operation.

For example, in U.S. Pat. No. 5,056,791 published Oct. 15, 1991 to inventor Poillon, entitled Golf Simulator And Analyzer System, the disclosure of which is incorporated herein by reference, the golf simulator can simulate a game of golf. Poillon, teaches, "A system that simulates indoors a game of golf as it would be played outdoors on a conventional golf course and also provides the player with a diagnosis of his golf swing. An accurate determination is made of the trajectory, spin and velocity of a driven golf ball is made to determine the flight path it would take in an unimpeded environment. From this information there is provided to the player a projected image that his golf ball would take on a real golf course as well as diagnostic information about his swing."

In United States patent publication US20090191929, published Jul. 30, 2009, entitled Golf Simulator Connected To The Internet, by inventor Nicora, the disclosure of which is incorporated herein by reference, the inventor shows an internet tournament for golf simulators. This allows a variety of different virtual golf simulators around the world to connect to each other and have an online golf tournament. Unfortunately, the game was still not very realistic until more recently.

A variety of different virtual golf simulators can provide data on golf shots and compile them into personal statistics. Virtual golf simulators have sensors that can measure total driving distance, carry distance, launch angle, speed in miles per hour, angle to target, backspin, and side spin. For example, in U.S. Pat. No. 5,056,791 by inventor Poillon issued Oct. 15, 1991, entitled Golf Simulator And Analyzer System the golf simulator has a variety of sensors that can record trajectory spin and velocity of a driven golf ball, the disclosure of which is incorporated here in by reference.

Tracking systems have also become more powerful and accurate with faster processors. For example in U.S. Pat. No. 9,132,345, by inventor Nicora, et. al., issued Sep. 15, 2015, entitled Methods And Systems For Sports Simulation, a sports simulator calculates the rotational and translational velocity of a golf ball using a set of image analysis and emitters and sensors, the disclosure of which is incorporated herein by reference. The simulator then computes the future trajectory of the golf ball based on the rotational and translational velocity. Nicora, also describes similar device in U.S. Pat. No. 8,926,416 entitled sports simulator and simulation method, issued Jan. 6, 2015, also discusses image analysis for calculating a velocity vector, the disclosure of which is incorporated herein by reference. Nicora, also describes that the display screen can allow the golf ball to pass through it into a ball catcher and even return the ball back to the player as described in U.S. Pat. No. 8,834,284, issued Sep. 16, 2014, entitled Apparatus For Golf Simulation, the disclosure of which is incorporated herein by reference. In another related Nicora patent, U.S. Pat. No. 8,414,408 a golf simulator allows the player to launch a golf ball towards a display surface that shows the future trajectory of the golf ball, issued Apr. 9, 2013, the disclosure of which is incorporated herein by reference.

As shot data has improved in accuracy, modern golf simulators have no trouble outputting data such as total driving distance, carry distance, large angle, speed, angle to target, backspin, and side spin. Modern golf simulators can calculate using physics modeling, a virtual lie of the golf ball after a user hits the golf ball. The simulators can also animate for the user the golf ball flying through the air, bouncing on the fairway and even bouncing off of trees or bunkers.

SUMMARY OF THE INVENTION

The present invention is a complete golf game having a hybrid solution utilizing "Traditional golf simulators" in conjunction with an expansive "live play" environment. A physical golf course is combined with a booth having a virtual simulator. The virtual simulator has a software platform that allows players to transition from a golf simulation environment onto a live playing field. The golf virtual simulator adjust for individual user preferences such that players can increase difficulty and challenge as their skill level improves. A software map shows the logical process of the golf simulator.

The golf course has a hybrid configuration with a virtual golf simulator tee off for a fairway and then transitions to a live play environment once the user approaches the green. The virtual golf simulator can have a booth like configuration with a lounge behind the simulator. The user hits a ball in the simulator and the simulator senses the position and motion of the shot to calculate a starting location on the live play environment. After a user, or all of the users in a group tee off and are ready for the live play environment, the users can travel through a passage, which can be behind the screen, around the screen, or through an opening in the screen to a large live play area that is preferably indoors. The live play area can be set up in a warehouse that is climate controlled, or can be partially outdoors or completely outdoors.

The transition gives the illusion that the user has hit the ball down the fairway and is walking to the ball for close game shots on the green or near the green. As the user walks into the live play area, a position indicator such as a lighted indicator such as an overhead beam of light generated by LCD backlighting, or an overhead mounted laser can project an augmented reality indication of where the next ball will be hit. The user can place the ball themselves, or a human caddy can place the ball based upon the augmented reality indication. The lighted indicator is generated from the algorithm which correlates the virtual golf simulator data with a location on the live play golf course. The lighted indicator can also include player identifying information such as a player number or a player name. The lighted indicator can be customized for additional game variability.

The virtual and live play hybrid golf attraction includes a virtual fairway apparatus simulating a fairway golf stroke. The virtual fairway apparatus includes a screen, player area, a ball sensor and a processor calculating a virtual ball lie from sensor input taken from the virtual fairway stroke. The processor calculates a ball placement location based on the virtual ball lie. A live play area is not virtual and has a green area and a hole target on the green area. The ball placement location is a physical location on the live play area.

The processor checks if the virtual ball lie is on the green area or the fairway area, and if the virtual ball lie is on the fairway area, the processor continues the virtual fairway play until the player is on the green area, and if the virtual ball lie is on the green area, the processor refers the player to the live play area. The processor calculates a ball placement intersection from the virtual ball lie, and the ball placement intersection includes an x-coordinate line and y-coordinate line.

The virtual and live play hybrid golf attraction optionally has a visual indicator marked on the playing field that indicates initial ball placement. The location of the visual indicator is calculated from the virtual ball lie. A software algorithm provides a scaled difficulty. The ball placement location is scaled to be closer to the hole target or further from the hole target than the virtual ball lie depending on user preferences. In a one to one mode the ball placement location is equivalent to the virtual ball lie.

The display screen of a display device has a simulation bay assignment screen indicating a bay assignment to a user. A simulation bay is formed as a booth with a pair of sidewalls and a ceiling. The virtual fairway apparatus is installed in the simulation bay. The display device includes a ball location screen with a map of the live play area. The ball can be a golf ball icon such as a flashing red sprite.

As exciting as virtual golf can be, users still desire a more satisfying experience.

The following call out list of elements can be a useful guide to reference the call out numbers of the drawings.

10 Playing Field
11 Building Wall
12 Building Ceiling
20 Green
21 Bunkers
22 Inside Rough
23 Outside Rough
24 Outside Wall
25 Right Wall
26 Left Wall
27 First Hole
28 Second Hole
29 Third Hole
30 Field Map
31 X-Coordinate Lines
32 Y-Coordinate Lines
33 Ball Placement Intersection
34 Grid
35 Outside Boundary
36 Right Boundary
37 Left Boundary
38 Inside Boundary
40 Software Mapping Algorithm
41 Golf Simulation Software
42 Transition Software
43 Live Play Dataform
44 Mode Selector
45 Hole Selection
46 Golf Simulation Operation
47 Recording Data
48 Recording Ball Lie
49 Capture Player Feedback
50 Capture Hole And Strokes
51 Map Ball Placement
52 Grid Algorithm
53 Grid Mapping Algorithm
54 Player Preference Algorithm
60 Clubhouse
61 Stairs
62 Second Floor Area
63 Booth
64 Transition Passage Entrance
65 Staging Area
66 Transition Passage
67 Fence
71 First Live Play Area
72 Second Live Play Area
73 Third Live Play Area
74 Four Live Play Area
75 Fifth Live Play Area
76 Sixth Live Play Area
77 Live Play Area
81 Golf Ball
82 Sloped Panel
83 Right Changeable Backdrop
84 Outside Backdrop
85 Referee Observation Window Display
90 Tee Area
91 Tee
92 Orientation Mat
93 Ball Sensor
95 Front Screen
96 Right Screen
97 Left Screen
98 Booth Ceiling
99 Fabric Ball Net
101 User Selection Screen
102 Main Menu
103 Choose Simulation Bay Screen
104 Simulation Queue Position Screen 105 Start Live Play Screen
106 Join Group Screen
107 Locate Ball Coarse Screen
108 Locate Ball Fine Screen
109 View Score Screen
110 Create Group Screen
111 Edit Score Screen
112 Enter Score Screen
120 Display Device
121 Processor
188 Operation Return To Main Menu

DETAILED DESCRIPTION OF THE PREFERRED EMBODIMENT

Figure 6:
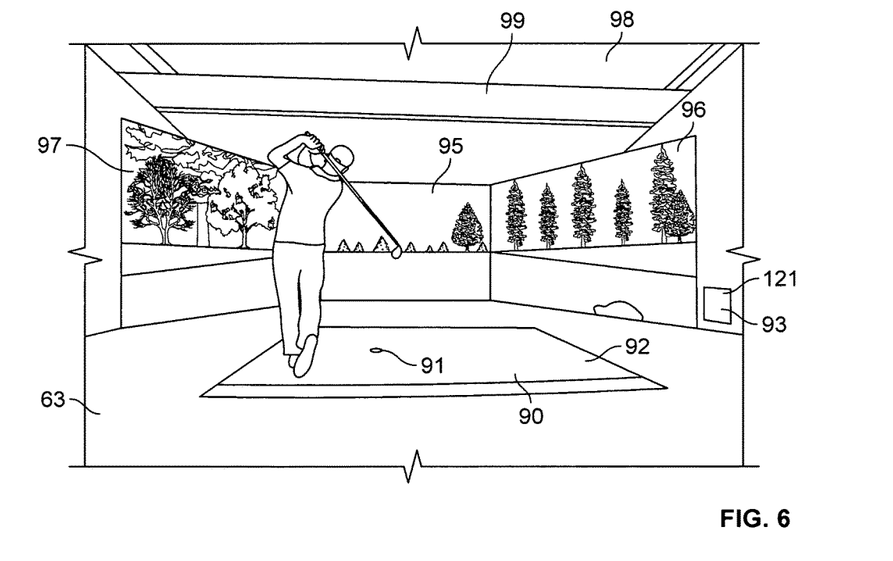
FIG. 6 shows the installation of the simulator in the booth.

The present invention starts with a commercially available virtual golf simulator as seen in FIG. 6. The virtual golf simulator has a variety of different standard components including a tee area 90 for a user to stand. A tee 91 can be mounted on an orientation mat 92 which faces a front screen 95. The front screen 95 can be flanked by a right screen 96 and a left screen 97 for a wraparound 180° visual effect. Additional screens can be added to have a 360° visual effect. The screen can be back projected, projected, LCD or the like. The ceiling 98 can also be back projected, projected or painted with texture. The ball sensor 93 can have various infrared laser arrays and have sensors mounted on the screens as well. Around the screens, a fabric ball net 99 catches golf balls after the user takes a shot. The booth ceiling 98 preferably also has a fabric ball netting for minimizing ricochet and bounce backs. Commercially available golf simulators produce a golf shot data set for each golf shot. The data can be output from the golf simulator. The virtual golf simulator is preferably housed in a booth on the first floor.

The data from the golf shot is used to transition the user to a live play environment based on individual preferences. The live play environment is a nonvirtual green and chipping fringe area that is located in or near the same building preferably with artificial grass. The live play environment is divided in a grid structure with thousands of unique locations to play from. Each grid has different characteristics that define the level of difficulty to play from that point to any of the 18 flag sticks on the course. The live play environment could be a single hole of only 1000 ft.$^2$, or could be a large area of 80,000 ft.$^2$. The architectural orientation of the live play environment and virtual simulator can be flexibly tailored to the needs of the attraction venue.

Figure 1:
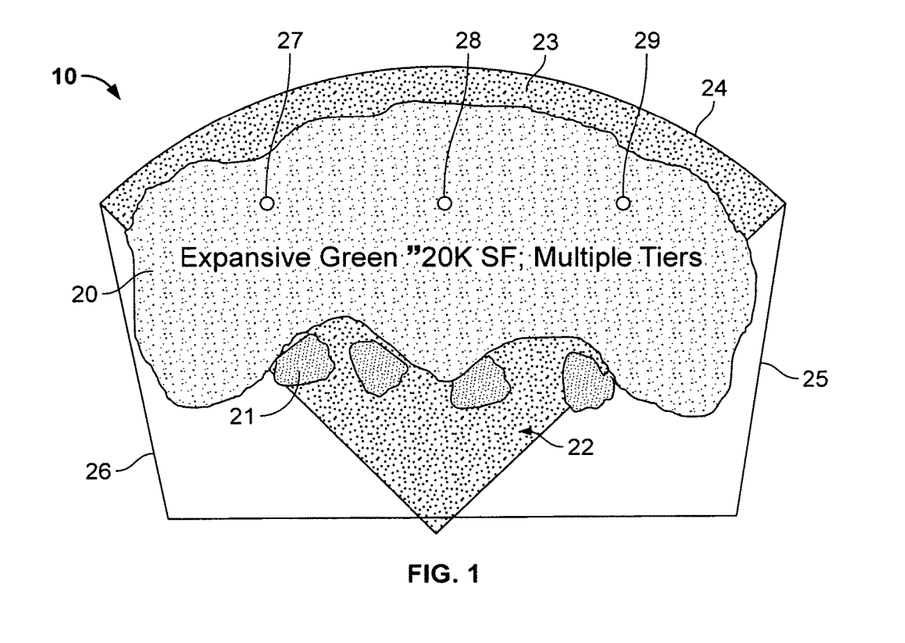
FIG. 1 is a diagram of a live play environment which could be 20,000 ft.$^2$, or any size tailored according to the venue.

The live play area include a playing field 10 and green 20. The green 20 can have a first hole 27, a second hole 28, and a third hole 29 to allow multiple users to play on the same large expansive green. The large expansive green can be about 20,000 ft.$^2$ with multiple levels or tiers. An outside rough 23 can be bounded inside a curved outside wall 24. The playing field 10 can be formed as an arc shaped field of synthetic or natural grass. The playing field 10 also includes bunkers 21, fringe or rough areas 22 boundary between a right wall 25 and a left wall 26. The playing field 10 can be indoors and housed in a warehouse structure to provide air-conditioning and artificial lighting for the players. The playing field 10 can be lighted to simulate dawn or dusk with artificial lighting, or can be located outside close to the virtual golf simulator.

Figure 2:
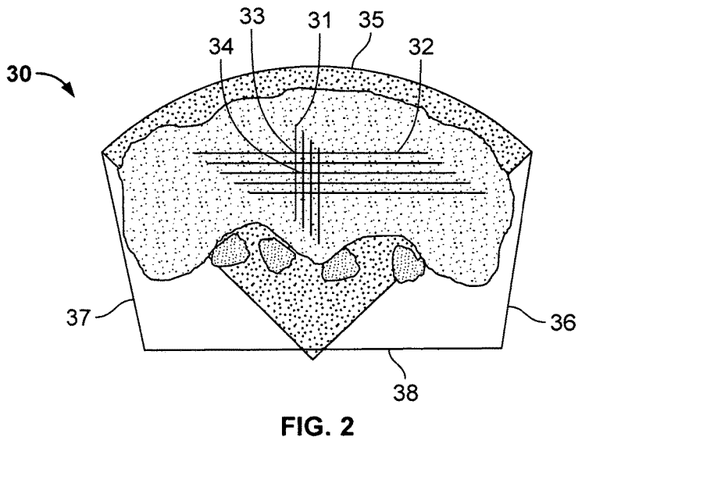
FIG. 2 is a diagram of a grid assignment definition.

The live play environment playing field 10 is represented virtually as a field map 30 of the live play area. The field map 30 includes a grid 34 formed by a plurality of x-coordinate lines 31 and y-coordinate lines 32. The outside boundary 85 of the field map 30 can conform to an outside wall 24 of the playing field 10. The grid 34 presents a number of locations for placing a ball including a ball placement intersection 33. The field map 30 can be generated from a rasterized overhead photograph of the actual playing field 10. Alternatively, the actual playing field 10 can be made according to the field map 30 which was used as a blueprint for constructing the site.

After a user takes a few strokes, the user gets to the green area of the simulation and the user is prompted to go to the live play area such as the playing field 10 for finishing the close game portion of the hole in a nonvirtual environment. The processor 121 calculates the location of the nonvirtual starting location based upon an algorithm. If a user is aiming at the first hole 27, the algorithm can scale the distance between the hole and the ball placement intersection 23 so that the ball lie is improved by being placed closer to the first hole 27 than ordinarily allowable under USGA rules. The scaling of the distance is proportional to the user level. A proportional handicap for the ball placement intersection 33 can produce a handicap that puts the ball closer along the x-coordinate lines 31 or along the y-coordinate lines 32. The x-coordinate lines 31 are locations where an x-coordinate is constant, and the y-coordinate lines 32 are lines where the y-coordinate is constant. For example, a beginner golfer could play according to a beginner mode that decreases the distance between the hole and the ball along the x-coordinates and the y-coordinates. For example, each of the X and Y coordinates could be decreased by 20% closer to the first hole 27. Also, difficult breaks can be removed by relocating the ball in an area of the green that is more flat. The scaling of the distance between the hole and ball placement intersection 33 is based on Cartesian coordinates and thus can be scaled in a linear or nonlinear relationship according to difficulty.

A customized transition from the virtual to the live play environment is thus based on individual preferences. The real putting green and chipping fringe area is divided into grids, providing at least 1500 unique locations to play from. Each grid has different characteristics that define the level of difficulty to play from that point to any one of the 18 flag sticks on the course. All of this data is mapped into a database and used by the transition software to allow players to tune their golf experience as they desire.

A beginner mode can be provided for user so that a player has a relatively easy shot from the green every time they transition from the simulation to live play. This is independent of the final resting position of their ball during simulation play. In a novice mode, the player will be given a shot that is relatively easier than the final resting position during simulation play, but more difficult than in beginner mode. Short chips are introduced in novice mode as well. The distance between the hole and the calculated resting location of the ball will be scaled such as by being decreased to be 20% closer to the first hole 27. In a real-life mode, a 1-for-1 relationship exists between final resting position in simulation and initial location to play from in live play. Thus, a user must land on the green area in the simulation to transfer over to live play. In the novice mode, the player could have a distance between the hole and the resting location of the ball that is scaled so that the user ends up in the green area of the simulation which transfers the player over to live play. Alternatively, in an expert mode, the player will always receive the most difficult shot available as their first shot in live play environment, independent of their final resting position in simulation.

The live play environment can use standard USGA rules identical to a traditional golf environment. A variety of different algorithms can be used for finding the live play ball location from the virtual simulator data. The virtual simulator data often has ball speed sensors and trajectory sensors that can determine the initial flight characteristics of the ball before the ball is arrested by the net, or screen. The initial flight characteristics in the simulator can be used to make a kinematical calculation based upon elementary physics to determine the live play location of the ball. Alternatively, a simpler method of calculation could correlate a location on the virtual simulator screen with a location on the live play green.

The grid can be at a large revolution such as a '4×'4 resolution where each starting point is 4 feet away from the next starting point. An expansive green of about 20,000 ft.$^2$ could be used and could have multiple tiers. The '4×'4 resolution grid can have ball placement intersections 33 that have varying degrees of difficulty, where each starting location has assigned attributes. The transition software uses grid data along with data from the simulation environment to assign players their first shot location in a live play environment. Also, the transition software can learn player preferences and adjust the experience accordingly.

Figure 3:
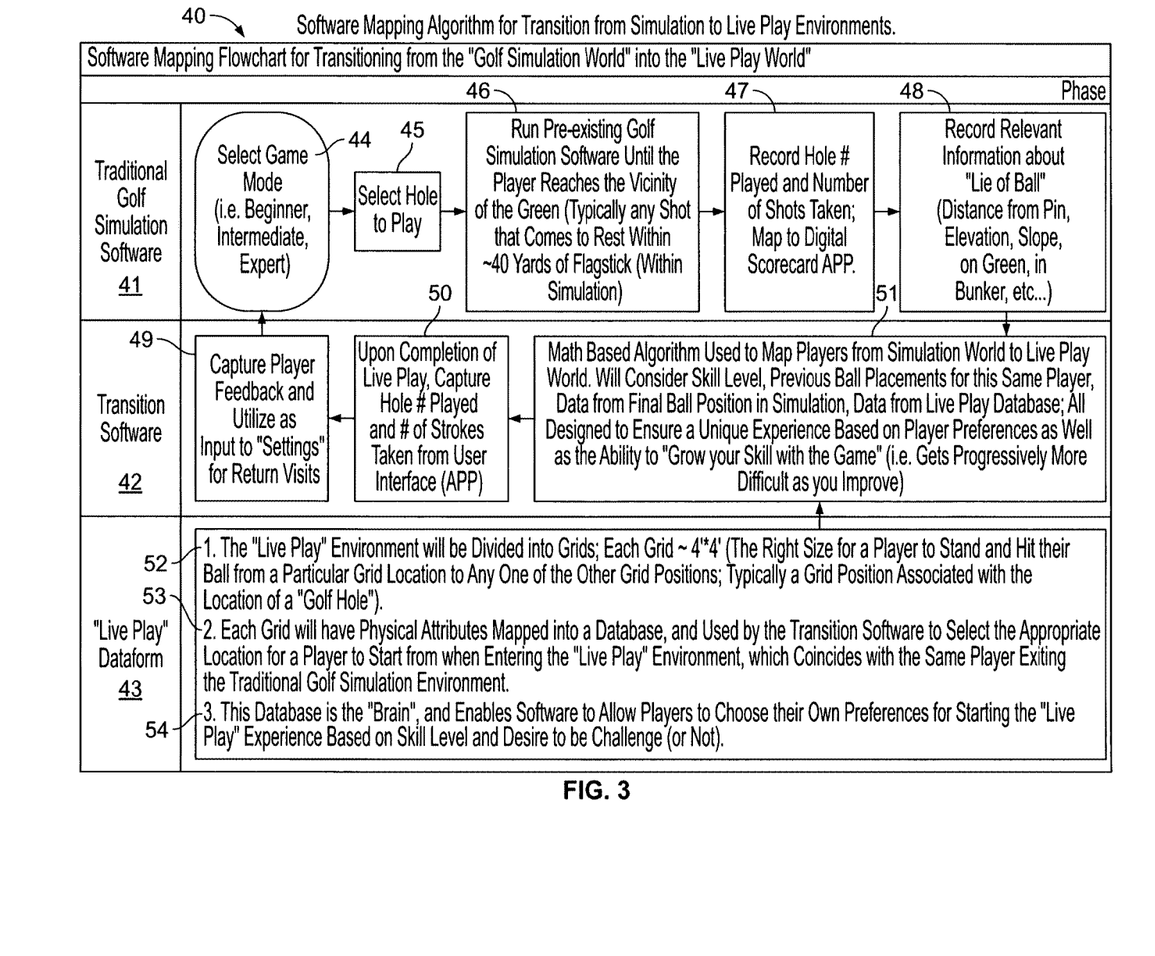
FIG. 3 is a software mapping algorithm for transition between simulation and live play

As seen in FIG. 3, a software mapping algorithm 40 has three components, namely the traditional golf simulation software 41, the transition software 42, and the live play dataform 43. Beginning with the traditional golf simulation software 41, the user selects a game mode in a mode selector 44. The mode selector selects a difficulty level or playing mode such as beginner, intermediate or expert. Then, the user selects a hole in a hole selection 45. The golf simulation software operates in a golf simulation operation 46. The golf simulation software can be run for example until he shot comes to rest within 40 yards of the flagstick. The software then records a hole number plate and number of shots taken which is then mapped to a digital scorecard application in a recording data 47 step. The lie of the ball is also recorded which includes distance from pin, elevation, slope on green whether or not it is in a bunker and other related data in a recording ball lie 48 step.

After the recording ball lie 48 step, the ball placement is mapped on a map ball placement 51 step. The map ball placement algorithm can consider skill level, previous ball placements, data from the live play database and player preference settings for setting a ball placement. The map ball placement 51 step includes a variety of different functions.

The map ball placement 51 step has a first step of querying the grid algorithm 52. In querying the grid algorithm 52, the live play environment is divided into a grid with each grid intersection being a certain uniform location away from other grid positions. The grid 34 is a defined as a plurality of x-coordinate lines 31 and y-coordinate lines 32. The x-coordinate line 31 and the y-coordinate lines intersect at ball placement intersections 33. The ball placement is at one of the ball placement intersections 33. The field map 30 is a virtual map of the playing field 10. The processor 121 correlates the playing field's physical dimensions and profile to a virtual field map 30.

Figure 4:
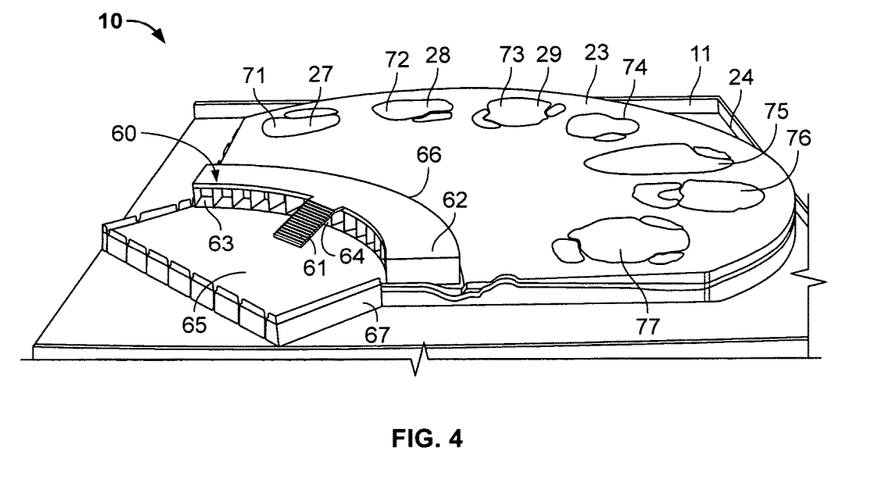
FIG. 4 is a diagram showing the hybrid golf course.

When a user transitions to the playing field 10 the system generates a ball placement for the user. The ball placement is at the ball placement intersection 33. The ball placement intersection 33 is calculated from the output data of the virtual simulator. The virtual simulator is preferably at the booth 63. When the user passes through the transition passage 66 to the live play areas, the user has a wireless device that indicates ball location. Also, a lighted indicator generated from a projected light source such as a laser light can indicate ball placement.

The grid mapping algorithm 53 step provides for physical attributes of each grid ball placement intersection 33 to be mapped to the database used by the transition software to select the appropriate location for user to start when entering the live lay environment. The physical attributes can include information such as x-coordinate, y-coordinate, distance from pin and slope. The database maintains a player preference algorithm 54 and player preference information. The player preference algorithm 54 allows players to choose their own preferences for starting the live play experience based on skill level and desire to be challenged. The player preference algorithm 54 can suggest to a user of low skill to try a beginner setting, and as the user statistically improves, the player preference algorithm 54 can suggest a more challenging setting. The suggested setting is mediated by the user selection in the mode selector 44 step. The mode selector therefore can work differently for different users.

After completion of live play, the transition software captures the hole number and number of strokes taken from the user interface application. The capture hole and strokes step 50 allows the transition software to capture player feedback 49 to return the player to the next hole. The capture player feedback 49 step can send data to a database for return visits. The software can run on the processor and the processor can have a memory and a wireless transmitter for sending data.

The venue design, as seen in FIG. 4, can include a large area that has a clubhouse 60 with stairs 61 leading to a second floor area 62. The staging area 65 can be a line area, lounge, restaurant or a ticket sales area. The staging area 65 is bounded by a fence 67. The second floor area 62 is above virtual simulator booths 63. The booths 63 have a floor, ceiling and sidewalls. A transition passage entrance 64 allows users to pass through a transition passage 66 to travel from the booth 63 to the live play areas. A first live play area 71 can have a first hole 27. A second live play area 72 can have a second hole 28. A third live play area 73 can have a third hole 29. A fourth live play area 74, a fifth live play area 75, a sixth live play area 76 and a seventh live play area 77 can fit in the playing field 10. The playing field 10 is preferably bounded by a building wall 11.

Figure 5:
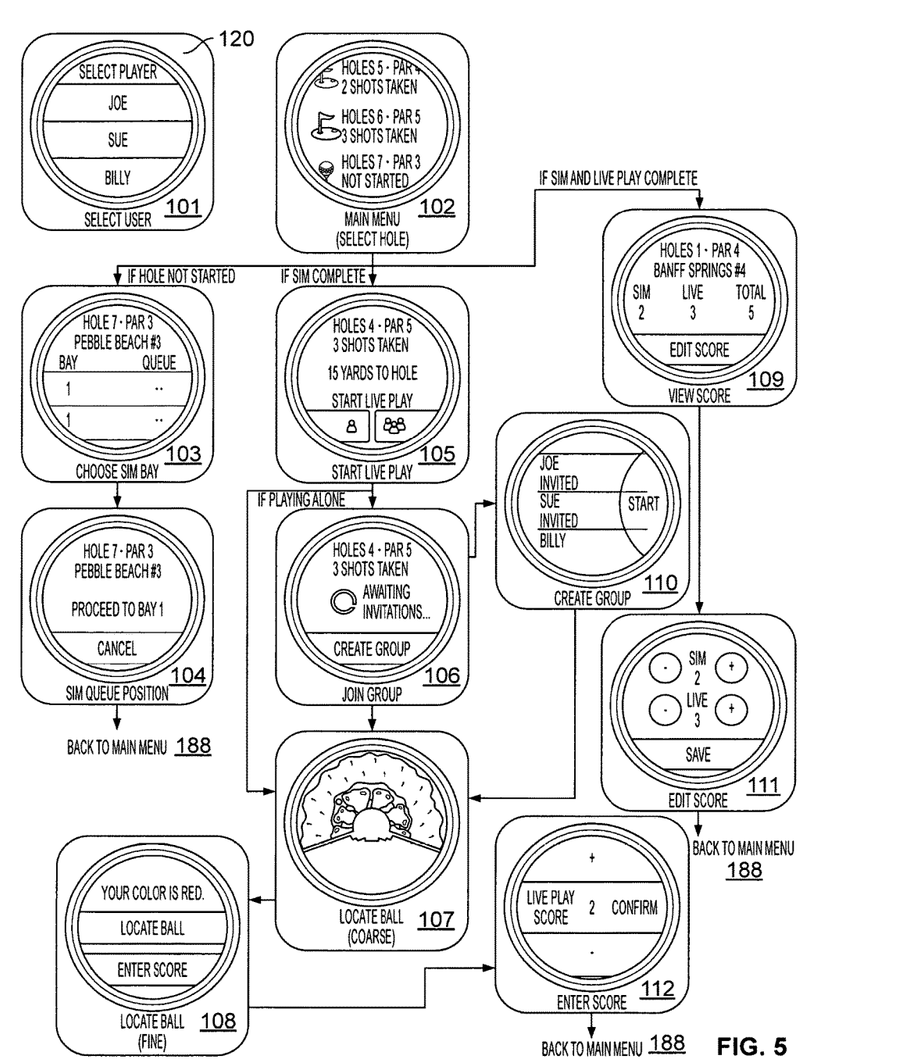
FIG. 5 is a flowchart diagram showing screenshots of a display device having a circular display screen.

In a busy amusement park or theme park, dozens of users can be congregating around the attraction. Users need navigation and direction while traveling around the golf attraction. A display device 120, as seen in FIG. 5, can be provided to each user to maintain crowd control. The display device 120 has a display screen that can be an wrist mounted LED devices such as a smart watch running android or iOs or the like. Users are provided display devices 120 for the term of their use of the attraction.

The display device 120 first begins at a user selection screen 101. The user selection screen can have a round LCD display area with a ring-shaped border, or the display can be rectangular. The user selection screen 101 allows the player to identify the account that the player is using. After the user selection screen, the main menu screen 102 provides a view of the holes played and not played. The main menu screen 102 keeps track of the holes in a list to provide a quick visual reference for the user. If the hole has not yet been started, the user can select the hole and proceed to a choose simulation bay screen 103. The choose simulation bay screen 103 may have a list of bay numbers and a queue of users to provide an orderly usage of the simulation bay mounted in the booth. The display device 120 can then notify the user to start the simulation at a simulation queue position screen 104 so that the user can know when to proceed to the simulation bay. The user can relax in the lounge, or hang out with other friends while waiting so that the users do not need to stand in line waiting for a simulation bay.

After the user goes to the simulation bay and plays the strokes, the display device 120 goes to the main menu which then notes that the simulation portion of the hole has now been played. Users can play other simulation portions or continue with the hole at their leisure so that there is no rush or excessive waiting. If the simulation is complete, the user can proceed to the live play area when notified in the start live play screen 105. The start live play screen 105 shows the shots taken, the yards to the hole and explains to start live play. If playing alone, the user is sent directly to the coarse ball location screen 107, but if the user is playing with a group, the user is sent to the join group screen 106. The join group screen 106 can group players together for a common close game. The join group screen 106 can interface with a variety of different social media network applications. The user can also create a group in the create group screen 110.

The first ball location screen 107 gives a general location of the ball which can be shown as a circle. In this case, the ball is located at a rough area past the second hole between the second green on the third green. The user then has a locate ball fine screen 108. The ball location can be highlighted with a ceiling mounted laser or colored light. The locate ball fine screen 108 shows that the indicator color is red and the enter score button below the locate ball button. Pressing the locate ball button on the fine locate ball screen 108 can produce a laser or lighted indicator on the ground. The lighted indicator can be a crosshairs, an arrow or the like. After playing the hole, the user can press the enter score button, or can be automatically referred to the enter score screen 112.

The user can be automatically referred to the enter score screen 112 if the user has a radiofrequency identification tag located on the golf ball that interacts with a radio frequency identification scanner mounted in the hole. The enter score screen 112 allows the user to enter the number of strokes in the live play portion of the game. The user is then sent back to the main menu 102.

Once the simulation and live play are both complete, the user can go to a view score screen 109 and view or optionally edit the score in an edit score screen 111. Additionally, the game referee can contact the user through the display screen 120 if necessary for sending the user a message.

Figure 7:
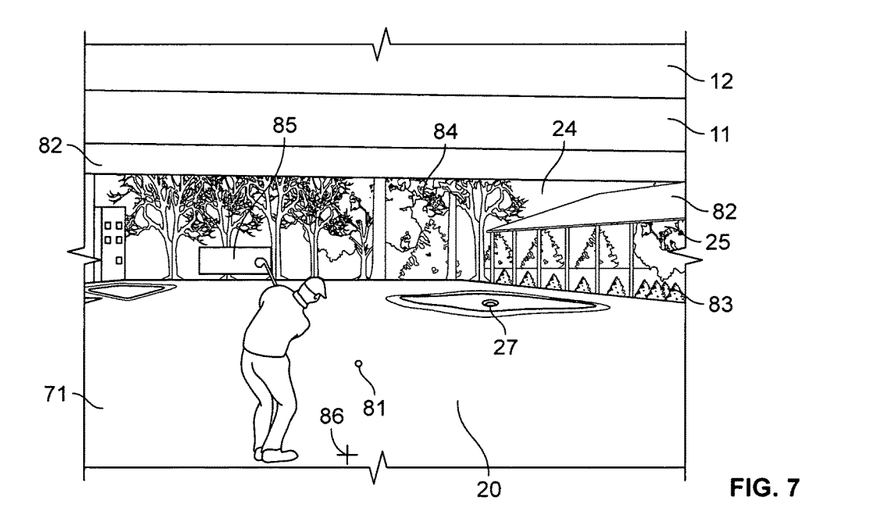
FIG. 7 shows an indoor live play area with a hole target.

As seen in FIG. 7, the user hits the golf ball 81 and the golf ball 81 is traveling toward the first hole 27 of the green 20. When made indoors, the ball placement intersection indicator 86 can be shown as a cross that is illuminated from a laser lighting system. Either a single laser can be used that projects multiple intersection indicators, or multiple lasers can project multiple ball placement intersection indicators 86. The ball placement intersection indicator 86 has a position that is calculated to correspond to the ball placement intersection 33 of the field map 30. The ball placement intersection indicator 86 is a physical indicator made of photons reflecting from the playing field 10. The building ceiling 12 can be covered by a suspended screen to project an outdoor environment. The building wall 11 is preferably not seen because it is covered by the outside wall 24. The outside wall 24 can have a sloped panel 82 that forms a roof like structure to roll stray balls back toward the playing field 10 if the balls leave the playing field 10. The outside wall 24 can have a referee observation window display 85 that can be a one-way mirror to allow a referee to view the players. The referee observation window display 85 can also display messages for the players. The right wall 25 can also have a sloped panel 82. The right wall 25 can have a right changeable backdrop 83 and the outside wall 24 can have an outside changeable backdrop 84. The changeable backdrop can be projected by overhead projectors, or can be back projected from rooms under the sloped panels 82.

Also, the ball location indicator can be performed manually such as by a human caddy placing a ball or coin marker rather than an overhead lighting device such as a laser projecting an ball location indicator icon on the playing field. The ball location indicator could be formed by having coordinates marked on the playing field for example, or have coordinate locations on the walls surrounding the playing field. Also, the ball location indicator can be indicated on the virtual golf simulation screen so that after the user reaches the green, the screen of the virtual golf simulator can show where to go to place the ball at the coordinate intersection. The coordinates could be marked in letters along the y-axis and numbers on the x-axis for example.

The following description describes an example of the invention which is defined by the claims below. Persons of ordinary skill in the art can appreciate that obvious modifications to the preferred embodiment do not depart from the spirit of the invention as defined by the claims below. For example, user defined difficulty level settings can change the scaled difficulty which influences the ball placement location in a nonlinear proportional relationship.

The invention claimed is:

1. A virtual and live play hybrid golf system comprising:
a virtual fairway apparatus simulating a fairway golf stroke, wherein the virtual fairway apparatus includes a screen, player area, a ball sensor and a processor calculating a virtual ball lie from sensor input taken from the virtual fairway stroke, wherein the processor calculates a ball placement location based on the virtual ball lie;
a live play area that is not virtual, wherein the live play area has a green area and a hole target on the green area, wherein the ball placement location is a physical location on the live play area;
wherein the processor checks if the virtual ball lie is on the green area or the fairway area, and if the virtual ball lie is on the fairway area, the processor continues the virtual fairway play until the player is on the green area, and if the virtual ball lie is on the green area, the processor refers the player to the live play area;
wherein the processor calculates a ball placement intersection from the virtual ball lie, wherein the ball placement intersection includes an x-coordinate line and y-coordinate line; and
a visual indicator marked on a playing field that indicates initial ball placement, wherein the location of the visual indicator is calculated from the virtual ball lie, wherein the processor is configured to process a software algorithm that provides a scaled difficulty, wherein the ball placement location is scaled to be closer to the hole target or further from the hole target than the virtual ball lie depending on user preferences, wherein in a one to one mode the ball placement location is equivalent to the virtual ball lie.

2. The virtual and live play hybrid golf system of claim 1, further including: a display screen of a display device, wherein the display screen has a simulation bay assignment screen indicating a bay assignment to a user, further comprising a simulation bay formed as a booth with a pair of sidewalls and a ceiling, wherein the virtual fairway apparatus is installed in the simulation bay.

3. The virtual and live play hybrid golf system of claim 2, wherein the display device further includes a ball location screen with a map of the live play area.

4. The virtual and live play hybrid golf system of claim 1, further including: a visual indicator marked on the playing field that indicates initial ball placement, wherein the visual indicator is a lighted indicator generated from a light source, wherein the location of the visual indicator is calculated from the virtual ball lie; and further comprising a display screen of a display device, wherein the display screen has a simulation bay assignment screen indicating a bay assignment to a user, further comprising a simulation bay formed as a booth with a pair of sidewalls and a ceiling, wherein the virtual fairway apparatus is installed in the simulation bay, wherein the display device further includes a ball location screen with a map of the live play area.

5. A virtual and live play hybrid golf system comprising:
a virtual fairway apparatus simulating a fairway golf stroke, wherein the virtual fairway apparatus includes a screen, player area, a ball sensor and a processor calculating a virtual ball lie from sensor input taken from the virtual fairway stroke, wherein the processor calculates a ball placement location based on the virtual ball lie:
a live play area that is not virtual, wherein the live play area has a green area and a hole target on the green area, wherein the ball placement location is a physical location on the live play area;
wherein the processor checks if the virtual ball lie is on the green area or the fairway area, and if the virtual ball lie is on the fairway area, the processor continues the virtual fairway play until the player is on the green area, and if the virtual ball lie is on the green area, the processor refers the player to the live play area;
wherein the processor calculates a ball placement intersection from the virtual ball lie, wherein the ball placement intersection includes an x-coordinate line and y-coordinate line; and wherein the processor is configured to process a software algorithm that provides a scaled difficulty, wherein the ball placement location is scaled to be closer to the hole target or further from the hole target than the virtual ball lie depending on user preferences, wherein in a one to one mode the ball placement location is equivalent to the virtual ball lie.

6. The virtual and live play hybrid golf system of claim 5, wherein the processor processes user defined difficulty level settings that change the scaled difficulty which influences the ball placement location in a nonlinear proportional relationship.

7. The virtual and live play hybrid golf system of claim 5, further including: a display screen of a display device, wherein the display screen has a simulation bay assignment screen indicating a bay assignment to a user, further comprising a simulation bay formed as a booth with a pair of sidewalls and a ceiling, wherein the virtual fairway apparatus is installed in the simulation bay.

8. The virtual and live play hybrid golf system of claim 7, wherein the display device further includes a ball location screen with a map of the live play area.

9. The virtual and live play hybrid golf system of claim 5, further including: a visual indicator marked on the playing field that indicates initial ball placement, wherein the visual indicator is a lighted indicator generated from a light source, wherein the location of the visual indicator is calculated from the virtual ball lie; and further comprising a display screen of a display device, wherein the display screen has a simulation bay assignment screen indicating a bay assignment to a user, further comprising a simulation bay formed as a booth with a pair of sidewalls and a ceiling, wherein the virtual fairway apparatus is installed in the simulation bay, wherein the display device further includes a ball location screen with a map of the live play area.

\* \* \* \* \*